United States Patent
Dubynskiy et al.

(10) Patent No.: US 12,306,742 B2
(45) Date of Patent: **\*May 20, 2025**

(54) SYSTEM AND METHOD OF DETERMINING PROXIMITY BETWEEN DIFFERENT POPULATIONS

(71) Applicant: Microsoft Technology Licensing, LLC, Redmond, WA (US)

(72) Inventors: Sergiy Dubynskiy, Kenmore, WA (US); Tatiana Shubin, Redmond, WA (US); Sandhya Shahdeo, Snoqualmie, WA (US); Poornima Muthukumar, Bothell, WA (US)

(73) Assignee: Microsoft Technology Licensing, LLC, Redmond, WA (US)

( \* ) Notice: Subject to any disclaimer, the term of this patent is extended or adjusted under 35 U.S.C. 154(b) by 273 days.

This patent is subject to a terminal disclaimer.

(21) Appl. No.: 17/467,254

(22) Filed: Sep. 5, 2021

(65) Prior Publication Data

US 2023/0075564 A1    Mar. 9, 2023

(51) Int. Cl.
*G06F 11/36* (2006.01)
*G06F 11/3668* (2025.01)
*G06N 20/00* (2019.01)

(52) U.S. Cl.
CPC ......... *G06F 11/3668* (2013.01); *G06N 20/00* (2019.01)

(58) Field of Classification Search
CPC .............................. G06F 11/3668; G06N 20/00
See application file for complete search history.

(56) References Cited

U.S. PATENT DOCUMENTS

| 8,024,303 B2 | 9/2011 | Roehrle et al. |
| 9,009,738 B2 | 4/2015 | Matichuk |

(Continued)

FOREIGN PATENT DOCUMENTS

| WO | 2012167190 A1 | 12/2012 |
| WO | 2017071425 A1 | 5/2017 |

OTHER PUBLICATIONS

"Apple Beta Software Program", Retrieved from: https://web.archive.org/web/20150702133522/https://beta.apple.com/sp/betaprogram/welcome, Jul. 2, 2015, 2 Pages.

(Continued)

*Primary Examiner* — S. Sough
*Assistant Examiner* — Zheng Wei
(74) *Attorney, Agent, or Firm* — Novo TechIP International PLLC

(57) ABSTRACT

A method and system for analyzing a proximity between a first user population and a second user population includes receiving a request to perform a proximity analysis between the first user population and the second user population, accessing data related to the first user population and the second user population, providing the data related to the first user population and the second user population as input to a machine-learning (ML) model for analyzing the data to determine the proximity between the first user population and the second user population, receiving from the ML model as an output at least one of a composite proximity score between the first user population and the second user population, and providing display data relating to the output to a visualization mechanism for display. The composite proximity score may be calculated based on multiple characteristics and/or comparison metrics.

21 Claims, 8 Drawing Sheets

(56) References Cited

U.S. PATENT DOCUMENTS

| | | | |
|---|---|---|---|
| 9,246,935 | B2 | 1/2016 | Lietz et al. |
| 9,268,663 | B1 | 2/2016 | Siddiqui et al. |
| 9,684,579 | B1 | 6/2017 | Adams et al. |
| 9,703,691 | B1 | 7/2017 | Yim et al. |
| 9,934,384 | B2 | 4/2018 | Johansson et al. |
| 10,067,857 | B2 | 9/2018 | Ekambaram et al. |
| 10,073,692 | B2 | 9/2018 | Carter |
| 2012/0266155 | A1 | 10/2012 | Valeriano et al. |
| 2014/0278198 | A1 | 9/2014 | Lyon et al. |
| 2015/0012852 | A1 | 1/2015 | Borodin et al. |
| 2015/0317235 | A1 | 11/2015 | Lachambre et al. |
| 2016/0259638 | A1 | 9/2016 | El Maghraoui et al. |
| 2019/0034315 | A1 | 1/2019 | Acosta et al. |
| 2019/0050321 | A1 | 2/2019 | Sapozhnikov et al. |
| 2019/0236306 | A1* | 8/2019 | Ding ............... H04L 41/142 |
| 2019/0391798 | A1 | 12/2019 | Farrell et al. |
| 2020/0183811 | A1* | 6/2020 | Krishnan ............ G06F 11/3688 |
| 2020/0272552 | A1* | 8/2020 | Markiewicz ........... G06N 20/00 |
| 2021/0004311 | A1* | 1/2021 | Bhide ............... G06F 11/3608 |
| 2021/0081308 | A1* | 3/2021 | Golubev ............ G06F 11/3688 |
| 2021/0165641 | A1* | 6/2021 | Gilpin ............... G06F 11/3684 |
| 2022/0188220 | A1* | 6/2022 | Shailendra .......... G06F 11/3688 |
| 2022/0300400 | A1* | 9/2022 | Bikkina ............. G06F 11/3684 |
| 2022/0374345 | A1* | 11/2022 | Brown ................ G06F 40/30 |

OTHER PUBLICATIONS

"Chrome Release Channels", Retrieved from: https://web.archive.org/web/20210720192255/https://www.chromium.org/getting-involved/dev-channel, Jul. 20, 2021, 3 Pages.

"Help make the next release of Android the best yet.", Retrieved from: https://www.google.com/android/beta, Jul. 29, 2021, 3 Pages.

"Create a Device Pool in AWS Device Farm", Retrieved from: https://web_archive.org/web/20150717221738/https1docs.aws.amazon.comidevicefarmilatestideveloperguide/how-to-create-device-pool.html, Jul. 17, 2015, 3 Pages.

"Firebase Test Lab", Retrieved from: https://firebase.google.comidocsitest-lab/, Retrieved on: May 24, 2018, 4 Pages.

"Mobile App Testing Made Scalable", Retrieved from: https://bitbar.comitestingi, Retrieved on: May 24, 2018, 5 Pages.

Communication Pursuant to Rule 71 (3) Received for European Application No. 19824139.0, mailed on May 9, 2023, 7 pages.

Decision to Grant pursuant to Article 97(1) received in European Application No. 19824139.0, mailed on Jul. 27, 2023, 2 pages.

Final Office Action Mailed Date: Jun. 9, 2020, in U.S. Appl. No. 16/212,668, 19 Pages.

International Search Report and Written Opinion Issued in PCT Application No. PCT/US22/036603, Mailed Date: Oct. 4, 2022, 11 Pages.

International Search Report and Written Opinion Mailed Date: Apr. 15, 2020, in PCT Application No. PCT/US2019/063823, 11 Pages.

Non-Final Office Action Mailed Date: Dec. 16, 2019, In U.S. Appl. No. 16/212,668, 15 Pages.

Non-Final Office Action Mailed Date: Sep. 28, 2020, in U.S. Appl. No. 16/212,668, 23 Pages.

Notice of Allowance Mailed Date: Feb. 18, 2021, in U.S. Appl. No. 16/212,668, 14 Pages.

Rajiv D. Banker et al., Gauging the Quality of Managerial Decision Regarding Information Technology Deployment, IEEE, 1991, retrieved online on Feb. 10, 2021, pp. 276-286. Retrieved from the Internet: <URL:https://ieeexplore.ieee.org/stamp/stamp.jsp?tp=&arnumber=184070>. (Year: 1991).

* cited by examiner

SYSTEM AND METHOD OF DETERMINING PROXIMITY BETWEEN DIFFERENT POPULATIONS

BACKGROUND

Many developers of software programs perform preliminary testing and evaluations on their software programs before release to their production customers. To test a software program or a new update to a software program, the latest version of the program is often provided to a group of users for execution. Telemetry data relating to the software program is then collected from the group of users over a given time period and evaluated to identify any issues that need to be addressed before the program is released to a larger user population.

Different groups of users often have varying characteristics that may result in the users having different experiences with a software program. For example, users may utilize different types of devices, their devices may be associated with different operating systems or may use different types of communication mechanisms, storage devices and the like. Furthermore, the user interface (UI) language utilized by the users may be different. The different user characteristics are particularly prevalent in today's large global market for software programs.

Some of the different user characteristics may result in incompatibility or other issues with a software program. As a result, some of the users may experience more trouble with the software program than others. The small group of users selected for testing the software program are often selected at random and/or are chosen from insider groups or groups of users that may have expressed an interest in testing of software programs. This group may or may not include all the varying characteristics of the larger user population. However, if the testing group does not include all the characteristic of the larger user population, some issues may not be detected before the software program is released. Yet, given the large global user population for software programs and the number of varying characteristics the larger user population may have, it is difficult to determine if the small group of users is a good representation of the larger user population.

Hence, there is a need for systems and methods of determining proximity between different user populations.

SUMMARY

In one general aspect, the instant application describes a data processing system having a processor and a memory in communication with the processor wherein the memory stores executable instructions that, when executed by the processor, cause the data processing system to perform multiple functions. The functions may include receiving a request to perform a proximity analysis between a first user population and a second user population to determine proximity between the first user population and the second user population, accessing data related to the first user population and the second user population, wherein the data related to the first user population includes at least one of telemetry data associated with testing of a software application and feedback data, providing the data related to the first user population and the second user population as input to a machine-learning (ML) model for analyzing the data to determine the proximity between the first user population and the second user population, receiving from the ML model as an output at least one proximity score between the first user population and the second user population, and providing display data relating to the output to a visualization mechanism for display.

In yet another general aspect, the instant application describes a method for analyzing a proximity between a first user population and a second user population. The method may include receiving a request to perform a proximity analysis between the first user population and the second user population to determine proximity between the first user population and the second user population, accessing data related to the first user population and the second user population, wherein the data related to the first user population includes at least one of telemetry data associated with testing of a software application and feedback data, providing the data related to the first user population and the second user population as input to a machine-learning (ML) model for analyzing the data to determine proximity between the first user population and the second user population, receiving from the ML model as an output at least one of a proximity score between the first user population and the second user population, and providing display data relating to the output to a visualization mechanism for display.

In a further general aspect, the instant application describes a non-transitory computer readable medium on which are stored instructions that when executed cause a programmable device to receive a request to perform a proximity analysis between a first user population and a second user population to determine proximity between the first user population and the second user population, access data related to the first user population and the second user population, wherein the data related to the first user population includes at least one of telemetry data associated with testing of a software application and feedback data, providing the data related to the first user population and the second user population as input to a machine-learning (ML) model for analyzing the data to determine the proximity between the first user population and the second user population, receive from the ML model as an output at least one of a proximity score between the first user population and the second user population, and provide display data relating to the output to a visualization mechanism for display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
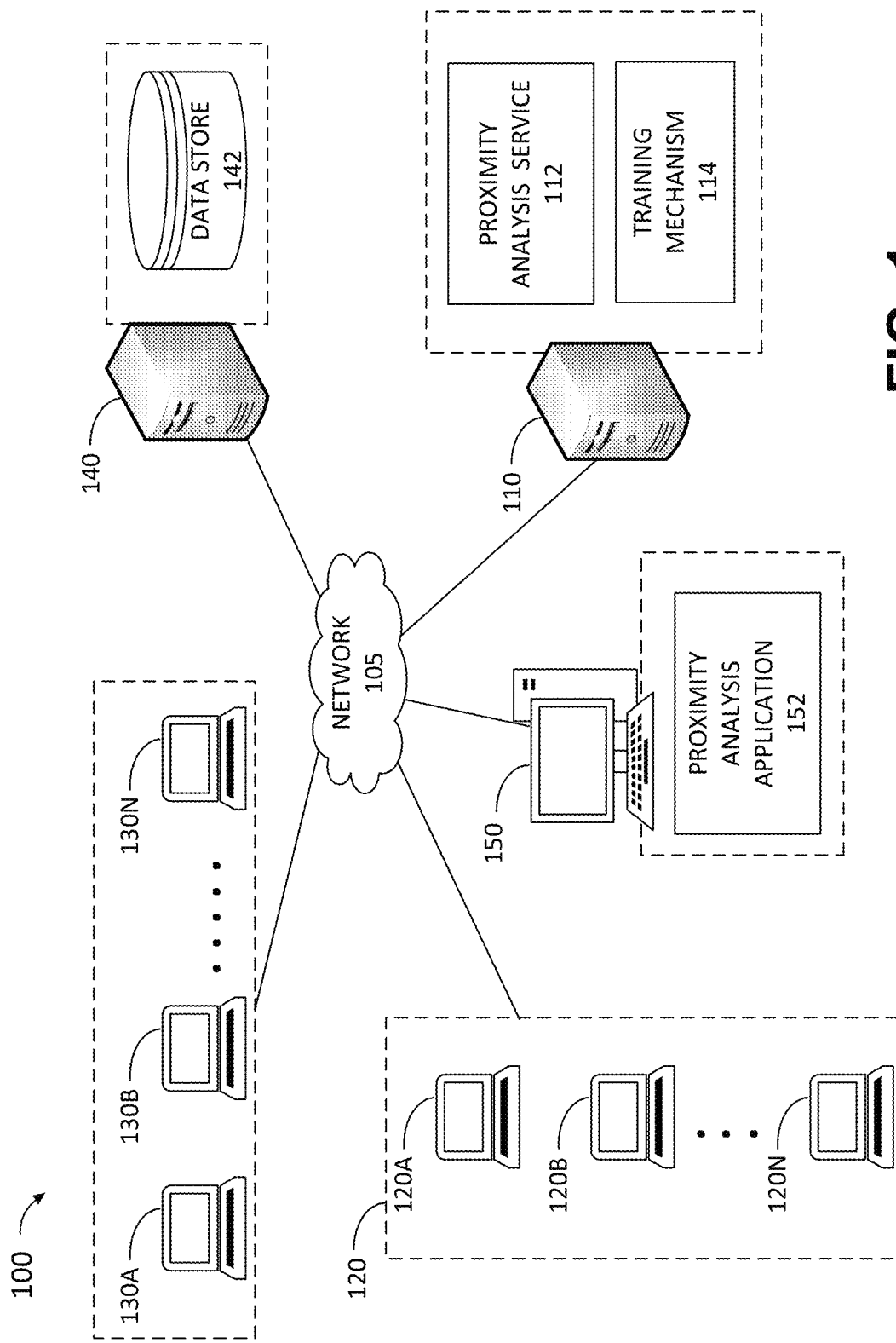
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Enterprises that develop and/or revise software programs often collect feedback and telemetry data from pre-production populations to assess the quality of the program, identify issues, and make release decisions. The pre-production populations are often a group of users that are smaller in size than the larger post-production population. In many instances, the pre-production populations are much smaller than the post-production population of users. Because the pre-production populations are smaller, they may not have all the characteristics of the larger post-production populations. These characteristics may relate to the type of devices used, type of operating system installed on the device, other applications installed on the device, the amount of storage space available on the device, the customer segment, usage behavior and the like.

Some of these characteristics when used in combination with a new or updated software program may result in issues when the new software program is executed. However, since the smaller pre-production populations may not include all the characteristics of the larger post-production population, some of the issues that the larger population may face with the software may not present themselves during the testing phase. This is particularly true for software programs that have a large global user population. For example, a software program may have a feature that does not function properly in the Japanese market (e.g., because of the UI language or because other characteristics of users in the Japanese market). If the pre-production population that was used to test the program does not have enough telemetry signals coming from the Japanese market, the developer would likely assume that the feature is working as intended and may proceed to release the feature to the entire global market which includes the Japanese market. This may result in an unpleasant user experience in the Japanese market, as many users in that market may experience issues with the software. However, given the significant number, diversity and complexity of the post-production user populations for software, and the fact that different user characteristics may have varying significance for different software programs, it is very difficult to determine if the pre-production population is a good representation of the post-production user populations for a given software program. For example, it may be difficult to determine the key characteristics that differentiate these populations. Current mechanisms for comparing the pre-production and post-production populations include performing separate comparisons between each different pre-production and post-production population for each individual characteristic. However, such approaches are very time consuming, subject to user bias, and significantly limited in terms of the number of characteristics that can be analyzed. Moreover, individual comparisons may determine some differences between the pre-production and post-production population for a given attribute, but such comparisons do not provide an overall similarity between the populations. Thus, there exists a technical problem of efficiently, quantitatively and accurately identifying key differences and measuring the proximity between the pre-production and post-production populations for a given software program.

To address these technical problems and more, in an example, this description provides a technical solution for identifying key characteristics that differentiate different user populations, and quantitatively measuring proximity between pre-production and post-production populations for a given software program based in part on the identified key characteristics. To do so, techniques may be used to collect feedback and telemetry data from a pre-production population of users, collect data relating to characteristics of a post-production population, and identify, based on the collected data, key characteristics that differentiate the pre-production and post-production populations. The identified key characteristics as well as the collected data may determine proximity between the pre-production and post-production populations. This may be done by calculating an overall proximity score between the two populations that can quickly display to a user the extent to which the pre-production population accurately resembles the post-production population. The overall proximity score may be calculated based on comparisons between various different characteristics of the two populations and the extent to which each of those characteristics are relevant to the given software program. In some implementations, a proximity score may be calculated for each of the key characteristics. Identifying key characteristics and determining the extent to which each of those characteristics is relevant to the given software program may be done by using one or more machine-learning (ML) models. The resulting calculations may be displayed in interactive UI screens and visualizations that include interactive manipulation of filters to view information about the different characteristics. This may enable a user to easily determine a level of proximity between different populations, identify characteristics for which proximity is lacking, and examine how changing various parameters may improve the overall proximity of the populations.

As will be understood by persons of skill in the art upon reading this disclosure, benefits and advantages provided by such implementations can include, but are not limited to, a technical solution to the technical problems of lack of a technical mechanism for determining an overall proximity level between a pre-production and post-production population for software programs. Solutions and implementations provided herein optimize the process of evaluating proximity between pre-production and post-production populations. This may enable the user to quickly and accurately determine if changes need to be made to the pre-production population to better represent the post-production population. The types of changes needed can be quickly identified by utilizing interactive UI screens that quickly and accurately identify key characteristics that differentiate the populations and the level of proximity for one or more of those characteristics. This reduces the amount of time and human capital needed to analyze pre-production and post-production populations and can lead to quick improvements to the proximity between the populations. As a result, issues in post-production of software programs can be reduced. The benefits provided by these technology-based solutions yield improved software programs thus resulting in an overall improvement in user experience for the post-production population.

As used herein, the terms "pre-production population" may refer to a smaller group of users that test a software program to assess the quality of the software build prior to its release to a larger population. The term "post-production population," on the other hand may refer to a larger population of users that use the software build after it has been released and gone through at least a first level of testing with the pre-production population. The term "characteristic" may be used to refer to an attribute of a population and may include market segments, operating system types and/or versions, device types, UI languages, and build versions.

FIG. 1 illustrates an example system 100, upon which aspects of this disclosure may be implemented. The system 100 may include a server 110 which may include and/or execute a proximity analysis service 112 and a training mechanism 114. The server 110 may operate as a shared resource server located at an enterprise accessible by various computer client devices such as client device 150. The server may also operate as a cloud-based server for offering global proximity analysis services for different enterprises and may be accessible by client devices such the client device 150. Although shown as one server, the server 110 may represent multiple servers for performing various operations.

The proximity analysis service 112 may operate as the backend engine for performing proximity analysis calculations and determinations and/or offering the calculation results in UI screens accessible by different client devices (e.g., a client device associated with a $1^{st}$ party or $3^{rd}$ party software product developer) that have access to the proximity analysis service 112. The proximity analysis service 112 may operate to receive telemetry data and feedback from a pre-production population such as the pre-production population 120, receive data relating to a post-production population such as the post-production population 130 and determine, based on the received information and/or additional parameters such as history data, which characteristics of the two populations are relevant to testing of the given software program or build. Furthermore, the proximity analysis service 112 may calculate proximity scores for one or more characteristics of the populations. For example, if the characteristics include device type, operation system version and UI language, the proximity analysis service 112 may calculate a proximity score between the pre-production population and the post-production population based on each of those characteristics. This may involve calculating the percentage of users having a given characteristic (e.g., Japanese UI language) among each of the pre-production and post-production users, and comparing the percentages to determine how closely the pre-production population mirrors the post-production population in the specific group (e.g., users having Japanese UI language).

In some implementations, the proximity analysis service 112 may utilize one or more ML models identify characteristics that are relevant to a given software application or build and/or to determine the weights that should be given to proximity scores that are calculated for each characteristic. The proximity analysis service 112 may then aggregate the individual proximity scores using the determined weights to calculate an overall proximity score between the pre-production and post-production populations for the given software program. In some implementations, the proximity analysis service 112 may also perform calculations on how to change the number and/or percentage of users from the pre-production population to improve the overall proximity score and/or the proximity score for a given characteristic.

One or more ML models implemented by the proximity analysis service 112 may be trained by the training mechanism 114. The training mechanism 114 may use training data sets stored in the data store 142 to provide initial and ongoing training for each of the models. Alternatively, or additionally, the training mechanism 114 may use training data sets from elsewhere. In one implementation, the training mechanism 114 uses labeled training data to train one or more of the models via deep neural network(s) or other types of ML models. The initial training may be performed in an offline stage. Additionally, and/or alternatively, the one or more ML models may be trained using batch learning.

As a general matter, the methods and systems described herein may include, or otherwise make use of, an ML model to identify relationships between telemetry data and characteristics in user populations. ML generally includes various algorithms that a computer automatically builds and improves over time. The foundation of these algorithms is generally built on mathematics and statistics that can be employed to predict events, classify entities, diagnose problems, and model function approximations. As an example, a system can be trained using data generated by an ML model in order to identify patterns in how user populations characteristics relate to issues identified in pre-production software builds. Such training may be made following the accumulation, review, and/or analysis of data (e.g., user data) over time. Such data is configured to provide the ML algorithm (MLA) with an initial or ongoing training set. In addition, in some implementations, a user device can be configured to transmit data captured locally during use of relevant software programs to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data, care must be taken to comply with privacy guidelines and regulations. For example, options may be provided to seek consent (e.g., opt-in) from users for collection and use of user data, to enable users to opt-out of data collection, and/or to allow users to view and/or correct collected data.

The server 110 may be connected to (e.g., via a network 105) or include a storage server 140 containing a data store 142. The data store 142 may function as a repository in which training data, collected telemetry data and/or data relating to various user populations is stored. In some implementations, the collected telemetry data and/or data relating to various user populations may be stored in a columnar format. The collected telemetry data and/or data relating to various user populations may be divided and stored separately for different time periods, different software programs and/or different enterprises.

Various elements of the system 100 may be connected to each other via the network 105. The network 105 may be a wired or wireless network(s) or a combination of wired and wireless networks. The client device 150 may be a personal or handheld computing device having or being connected to input/output elements that enable a user to interact with digital content such as a proximity analysis application on the client device 150. Examples of suitable client devices 120 include, but are not limited to, personal computers, desktop computers, laptop computers, mobile telephones; smart phones; tablets; phablets; smart watches; wearable computers; gaming devices/computers; televisions; head-mounted display devices and the like. The internal hardware structure of a client device is discussed in greater detail regarding FIGS. 5 and 6.

The client device 150 may include a proximity analysis application 152. The proximity analysis application 152 may be a computer program executed on the client device 150 that configures the device to be responsive to user input that allows a user to interactively view and/analyze population proximity calculations and determinations. The proximity analysis application 152 may function similarly to the proximity analysis service 112 and as such may be local application version of the proximity analysis service 112. Thus, the proximity analysis application 152 may provide a UI that allows the user to interact with population proximity calculations and determinations via the client device 150. In some implementations, the proximity analysis application 152 functions as a frontend application for the backend services offered by the proximity analysis service 112. Thus, the proximity analysis application 152 may function as a tool that enables a user to select various filters to view and/or analyze specific user population characteristics, proximity based on different characteristics, and overall proximity score. The user's selections may be transmitted to the proximity analysis service 112, where the calculations are performed, and the results may be transmitted back to the client device 150 to be displayed to the user via a UI of the proximity analysis application 152. Alternatively, the client device 150 may also provide access to the proximity analysis service 112 via a user agent such as a browser.

The system 100 may include a pre-production population 120. The pre-production population 120 may include a plurality of pre-production user devices 120A-120N, each of which may be used by a different user. The pre-production population 120 may be an insider population associated with an enterprise that develops software builds. For example, the pre-production population 120 may include user devices that are used by employees of the enterprise to test pre-production software builds before they are released to a wider population. In some implementations, the pre-production population 120 is a group of users randomly selected from a larger group of inside users for the enterprise. Alternatively, the pre-production population may be a small population of consumers and/or enterprise clients that have offered to test a software build. As such, each enterprise, software application and/or software build may be associated with a different pre-production population.

In addition to the pre-production population, the system 100 may also include a post-production population 130. The post-production population 130 may include a plurality of post-production user devices 130A-130N, each of which may be used by one or more different users. The post-production population 130 may include the population of users who will be using the software program or build after it is released. For example, for a software program that has already been released to users, the post-production population for the latest build of the software (e.g., latest version) may include many of the users that are currently subscribed or have currently installed the previous version of the software program. The post-production population is often larger than the pre-production population. In some implementations, the post-production population is also more diverse and as such may include more characteristics than the pre-production characteristics. However, in order to ensure that a given software build is properly tested, it is important to select the pre-production population such that it includes at least the population characteristics that are relevant to the given software build. The technical solution disclosed herein achieves this by identifying key characteristic that are relevant to a given software build, calculating proximity scores for those characteristics and calculating an overall proximity score between the pre-production and post-production populations.

Data about the users associated with the pre-production population 120 and post-production population 130 may be data that is already available to the software developer or enterprise. For example, the software program may have collected data about the user, the user's device, and the like, during a registration process. This data may be stored in a data store associated with and/or accessible to the enterprise (e.g., data store 142) and may be retrieved from such data store to send to the proximity analysis service 112 and/or proximity analysis application 152, when needed. It should be noted that in collecting, retrieving, storing and analyzing respondent data, care is taken to ensure the user's privacy is protected. The data may be stored in a columnar structure where each column corresponds to a different characteristic.

The characteristics may include a user type, language, OS code name and device manufacturer, among others.

Figure 2:
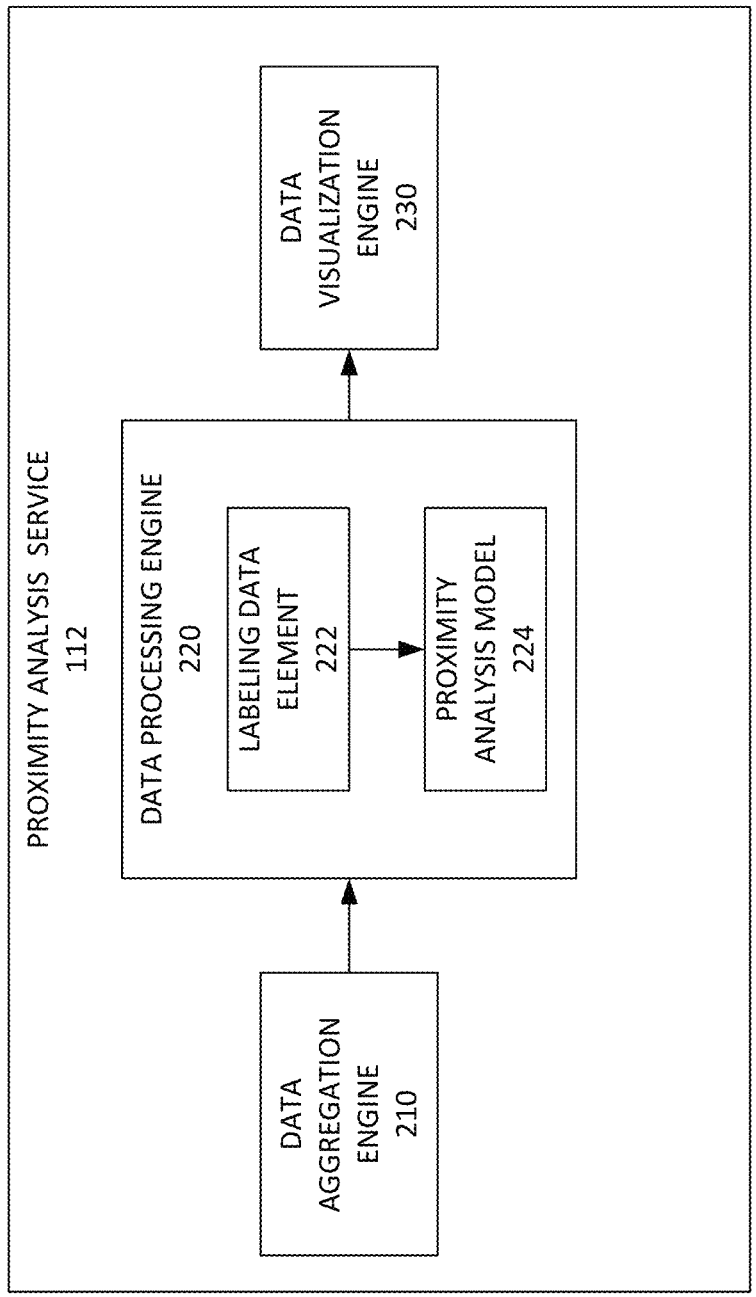
FIG. 2 is a block diagram illustrating example elements of a proximity analysis service.

FIG. 2 is a block diagram illustrating example elements of a proximity analysis service. The proximity analysis service 112 may include a data aggregation engine 210, a data processing engine 220 and a data visualization engine 230. The data aggregation engine 210 may receive various types of data from pre-production and post-production populations as they relate to a software program or build. The different types of input data may depend on the nature of the product (e.g., nature of the software build), the enterprise developing the product and the like. In some examples, the data may include a set of vectors for the pre- and post-production populations, as well as negative and positive feedback signals for learning of the one or more ML models. The set of vectors may include characteristics of the pre-production population such as the type of user (e.g., enterprise or consumer), operation system type, operation system model, device type, language and the like. The set of vectors may also include telemetry data from the testing of the software build. The telemetry data may include the number of crashes and/or the number of errors in a given time period, amount of use by users, user rating and the like. The data aggregation engine 210 may access and/or receive the input data and perform data aggregation and/or clean-up as needed before providing the aggregated data to the data processing engine 220.

The data processing engine 220 may include a data labeling element 222 and a proximity analysis model 224. In some implementations, the data labeling element 222 may label some of the input data received from the data aggregation model for providing to the proximity analysis model 224 to enable self-learning for the model. The proximity analysis model 224 may perform at least some self-learning based on the feedback signal received and labeled by the data labeling element 222. The proximity analysis model 224 may include an ML model trained via unsupervised training and/or an ML model trained via a supervised setting. For the ML model trained via unsupervised training, key characteristics of the populations (e.g., OS version, bitness, UI language, etc.) and other signals (e.g., number of sessions and application command counts) may be selected to train the model to compute similarity measures for the different characteristics as well as an overall proximity score. The selection may be done manually and may be based on domain expertise and as such may vary based on the software program In the supervised training setting, a specific selection of a similarity metric that should be used for calculating the proximity score may be learned by the model. For example, the model may learn to select from similarity metrics such as the Euclidian distance, overlapping index, Jaccard similarity, and the like. This can be achieved by providing a feedback signal to the model where the number of issues discovered in production is negatively correlated with the similarity metric. As such, a higher similarity between pre-production and post-production populations may ensure that issues are discovered early and fixed in the pre-production population before they propagate to the post-production population. The model may learn the best candidate for the proximity metric based on the strengths of its correlation with the feedback signal.

The supervised and/or unsupervised trained ML models may receive the input signals, identify and rank key characteristics that differentiate the pre-production and post-production populations and calculate proximity scores for one or more of the characteristics, as well as calculate an overall proximity score for the pre-production and post-production populations. In some implementations, the data processing engine 220 is provided as a web service and/or application programming interface by itself, such services and/or enterprises can add the data processing engine 220 as an extension to their deployment pipeline to optimize software releases and thereby improve the quality of their releases.

Once the calculations are performed, the proximity analysis model 224 may provide as an output one or more composite metrics such as proximity scores for various characteristics and an overall proximity score. The outputs may be provided to the data visualization engine 230 for visualization. The data visualization engine 230 may use one or more known visualization techniques for visualizing the results to a user. As an example, the data visualization engine 230 may utilize a plug and play visualization engine. For example, the data visualization engine 230 may utilize Microsoft® Power BI, Tableau or static website using visualization libraries such as D3, Bootstrap and the like. In some implementations, enterprises can use a data visualization mechanism of their choice. For example, third party users may receive the output from the data processing engine 220 and utilize a chosen data visualization mechanism to display the results.

Figure 3A:
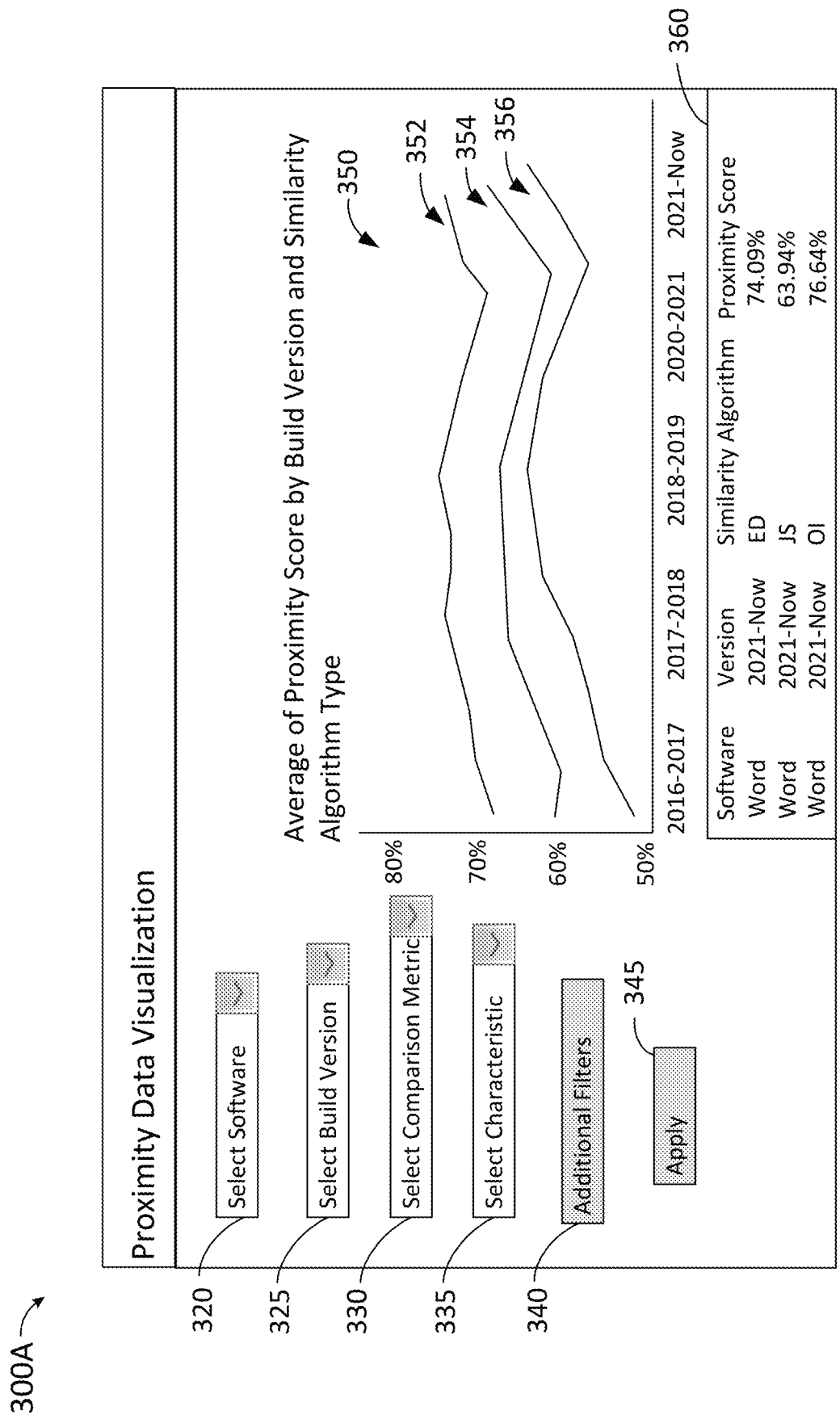
FIG. 3A-3C are example GUI screens displayed by a data analysis application or other data visualization mechanism used to display results of a population proximity analysis.
Figure 3B:
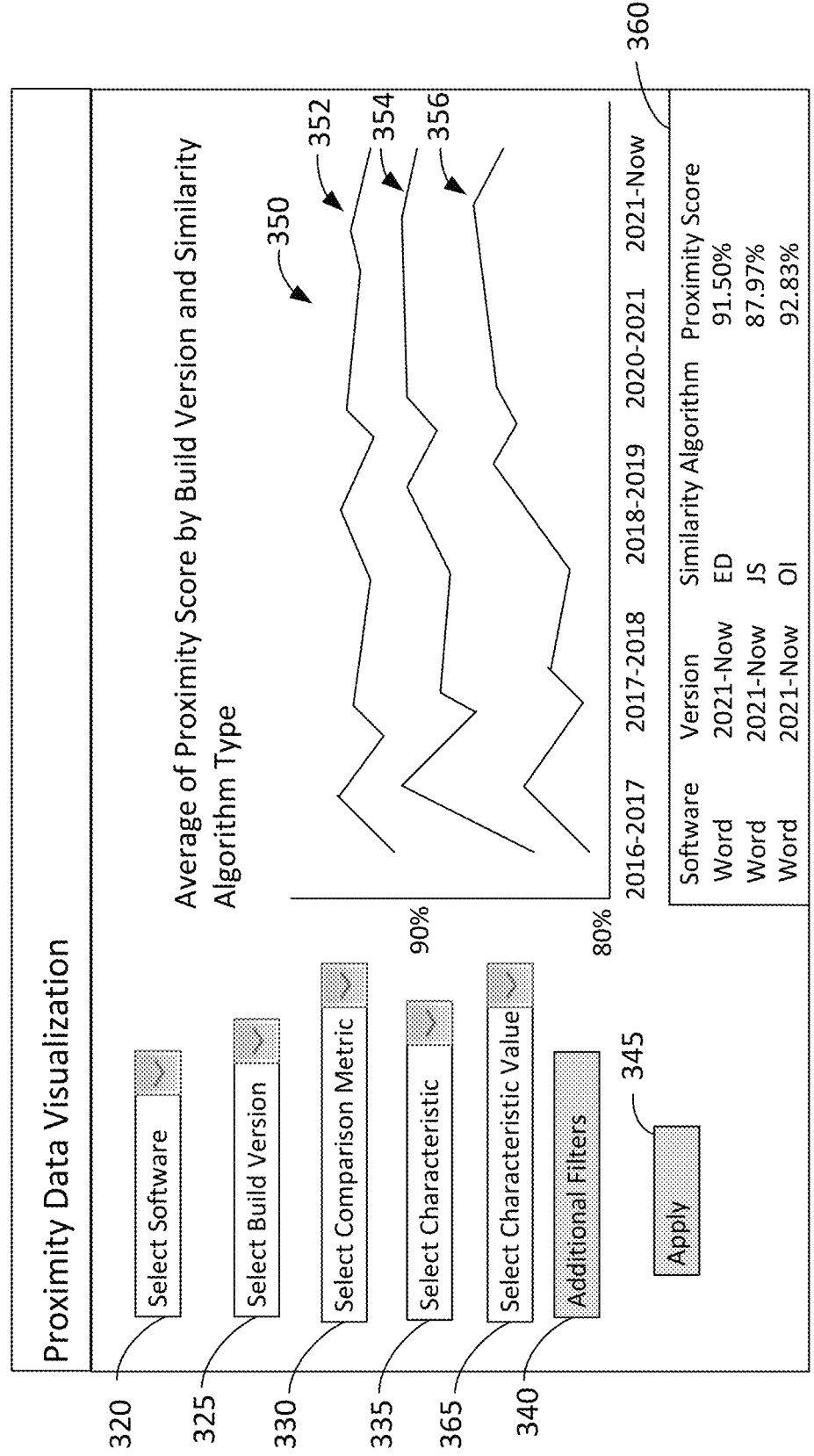
Figure 3C:
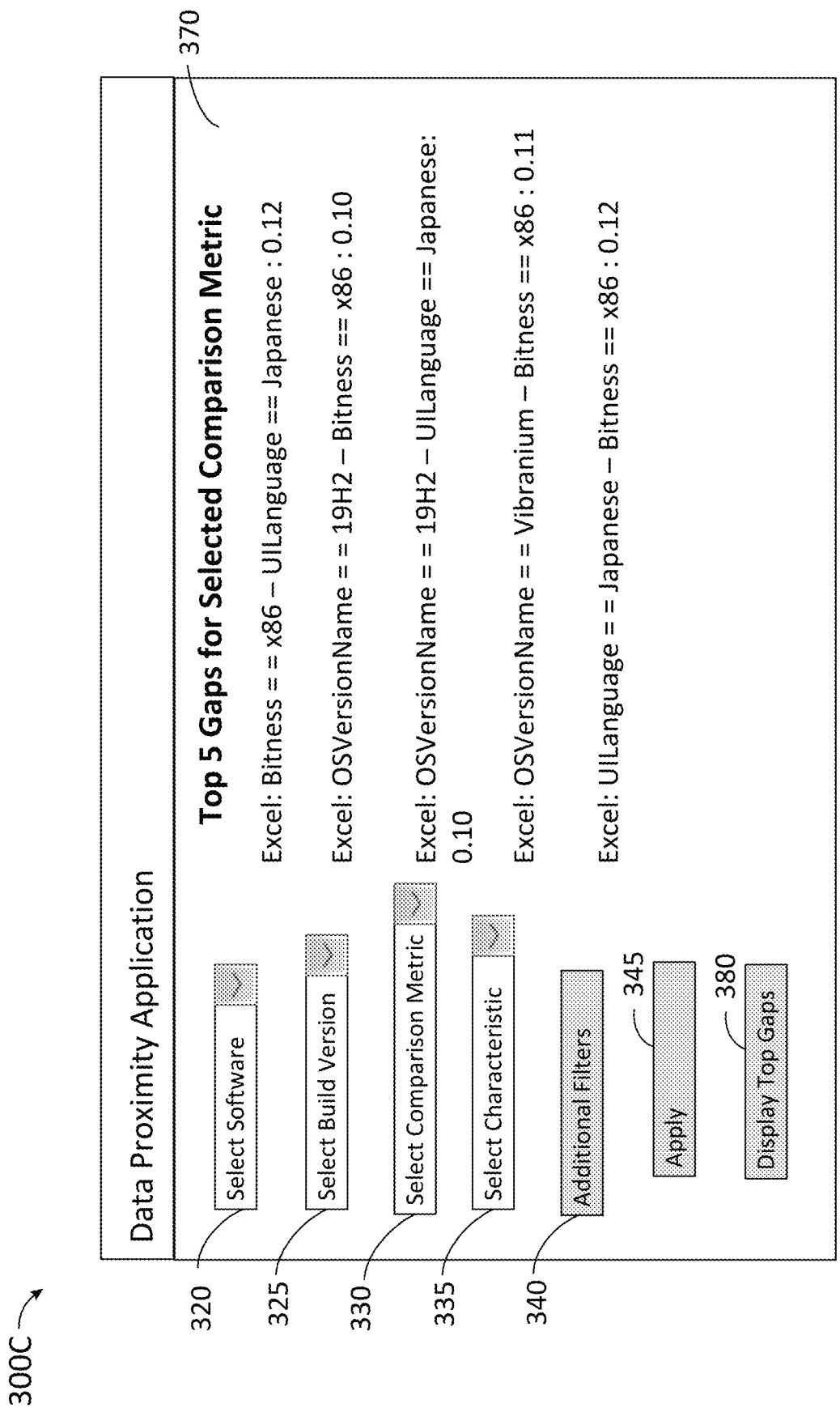

FIGS. 3A-3C are example GUI screens displayed by a data analysis application or other data visualization mechanism used to display results of a population proximity analysis. GUI screen 300A of FIG. 3A may be a display screen of a proximity analysis application which can be used by an administrator of an enterprise to review and analyze proximities between different user populations such as a pre-production and post-production population. In some implementations, the data analysis application or other data visualization mechanism used to display the proximity results communicates with a backend data analysis service, which may be stored in a server, to access population proximity data stored in a data store. The backend service may access the different population's data and perform calculations requested by the user via the GUI screen 300A.

Software development companies may conduct pre-production testing of various versions of a software application when a new version is developed and is being prepared for release. When such testing is performed, the software development company may desire to examine the pre-production population used for the testing to determine if the pre-production population is a good representation of the post-production population for the given software version. To enable such companies to analyze and compare the pre-production and post-production populations for proximity, the GUI screen 300A may include a menu option 320 for selecting the software application for which testing is being performed. Furthermore, to enable selection of the specific version of the software application, when multiple versions are available, a menu option 325 may be provided. Additionally, the GUI screen 300A may include a menu option 330 to enable the administrator to choose a comparison metric (e.g., total session count, total command counts, etc.) to compare the populations based on. Still further, the GUI screen 300A may provide a menu option 335 for selecting a specific characteristic of the population (e.g., OS version, bitness, UI language, etc.) to compare the proximity for.

In some implementations, additional filters may be selected via the menu option 340. For example, when more than one pre-production or post-production population is available for a software application or build version, the additional filters may enable the user to choose one of the populations. In some implementations, data relating to the populations must be available and accessible to the proximity analysis service to enable use of the GUI screen 300A for calculating and displaying the proximity values.

Once a software application, build version, comparison metric and/or characteristic has been selected, the menu option 345 may be used to apply the selected parameters for calculating proximities between two populations. In some implementations, the resulting calculations is displayed via a diagram such as the graph 350. Alternatively, the results may be displayed via different types of diagrams. In some examples, the results may be displayed via a table. In different implementations, instead of presenting the results on the same GUI screen, the results may be displayed via a different screen (e.g., a pop-up screen). In some implementations, the value for calculated proximity values may be displayed adjacent to the graph 350. It should be noted that the menu options 320, 325, 330, 335 and 340 are only example UI elements for selecting parameters in performing proximity analysis for different populations. Other types of UI elements are contemplated and may be utilized.

The graph 350 may display a proximity value between a pre-production population and a post-production population over time. For example, previous calculations may be stored and displayed in the graph such that changes in values can be tracked. In some implementations, the time range over which the proximity values are displayed may be selected, for example via the additional filters' menu option 340. The example graph 350 illustrates the proximity score for a Word software application from 2016 to present. In some implementations, multiple similarity algorithms may be used to calculate the proximity scores to enable the user to gain a better understanding of the range of proximity values. For example, proximity scores may be calculated using Euclidian distance (ED), overlapping index (OD, and Jaccard similarity (JS) algorithms. The proximity scores calculated by each of these algorithms may then be displayed on the graph 350 as shown. In the graph 350, line 352 depicts values calculated using the JS algorithm, while line 354 represents values calculated using the ED algorithm and line 356 displays values calculated using the OI algorithm. In some implementations, the user may be able to choose a similarity algorithm for performing the calculations.

In different configurations, additional information may be provided on the GUI screen 300A. For example, information about the latest trends in the proximity data may be displayed on a portion of the screen. In an example, if since the last time the pre-production population was changed and/or since the last version of the software was tested, the proximity score has increased, a notification relating to the increase and/or amount of the increase may be displayed on a portion of the GUI screen 300A. Additionally, information may be provided about software programs associated with the user (e.g., software programs for which the user has access to testing information) for which the overall proximity score has recently improved or regressed. In some implementations, a UI element may be provided to submit a request for calculating an overall proximity score for the selected software application and build version. Alternatively, the overall proximity score may be calculated and/or displayed when a request for calculating a proximity score relating to a comparison metric and/or characteristic is submitted. The overall proximity score may be displayed on the GUI screen 300A or may be displayed on a different GUI screen of the proximity analysis application.

In some implementations, a portion 360 of the GUI screen 300A may be used for displaying information on the calculations performed. For example, the screen portion 360 displays the name of the software program, the version for which analysis was performed, the similarity algorithm used and the resulting proximity score. In some implementations, the information displayed in the screen portion 360 may be customized. For example, the user may be able to select the types of information displayed in the screen portion 360 (e.g., selected comparison metric, characteristic, time range, etc.).

GUI screen 300B of FIG. 3B depicts an example proximity data visualization screen when a different type of comparison metric is selected. For example, in the GUI screen 300A, the selected comparison metric may be session count, while the selected comparison metric for the GUI screen 300B is application command count. For some selected comparison metrics, a menu option 365 may be provided for selecting a characteristic value. For example, when the selected comparison metric is command counts, the menu option 365 is provided to enable the user to select a characteristic value (e.g., when the characteristic is UI language, the selected characteristic value may be Japanese). As depicted in GUI screen 300B, selecting a different comparison metric for the populations may result in significantly different proximity scores and trends for the same software application and build version. Thus, proximity scores may vary widely based on different comparison metrics. The visualization screens of the technical solution provided herein enable the user to easily select the comparison metric and characteristic they are interested in analyzing to quickly and efficiently obtain detailed information about the proximity of the pre-production population to the post-production population with respect to a selected comparison metric and characteristic. For example, the user can choose to view the proximity of the pre-production population to the post-production population for the Japanese market by selecting Japanese language as the characteristic. Upon selection, the proximity data will be displayed in the data visualization screen thus enabling the user to determine if the pre-production population is within an acceptable range of proximity to the post-production population.

In some implementations, the data analysis application may provide an additional GUI screen, such as the one displayed in GUI screen 300C of FIG. 3C, to provide information on the top characteristics for which there are proximity gaps between the selected populations. The GUI screen 300C may be invoked via a menu option such as the menu option 380 for displaying top gaps. Once invoked, the proximity analysis service or application may provide data relating to the areas (combination of characteristic values) with biggest differences between the pre-production and post-production populations within a chosen comparison metric. The gaps may be displayed for selected software applications, build versions, and/or comparison metric. For example, when comparing two populations for Excel based on the comparison metric of session count, the system may identify that the largest difference between the populations (12%) is for the combination of the characteristics bitness and UI language, where the bitness value equals ×86 and the UI language is Japanese.

Information about the requested top gaps may be displayed in a screen portion 370 of the GUI screen 300C. The information may include, for the top identified gaps, the combination of characteristics associated with each gap, as well as the calculated percentage difference for each identified gap. In some implementations, the identified top gaps may be displayed in a different manner. For example, a graph may be used to display the top gaps. Additionally, an option may be provided to the user to select the range of percentage of difference between the two populations for a selected comparison metric. For example, the user may be able to submit a request for identifying the segments of the populations where the difference in distribution is within 2-15% for a selected comparison metric. Thus, the GUI screen 300C may provide information about specific characteristic values for a given comparison metric that are the top contributors in reducing proximity scores between 2 populations. This can quickly show the user areas that require improvement and/or changes to the pre-production population.

Figure 4:
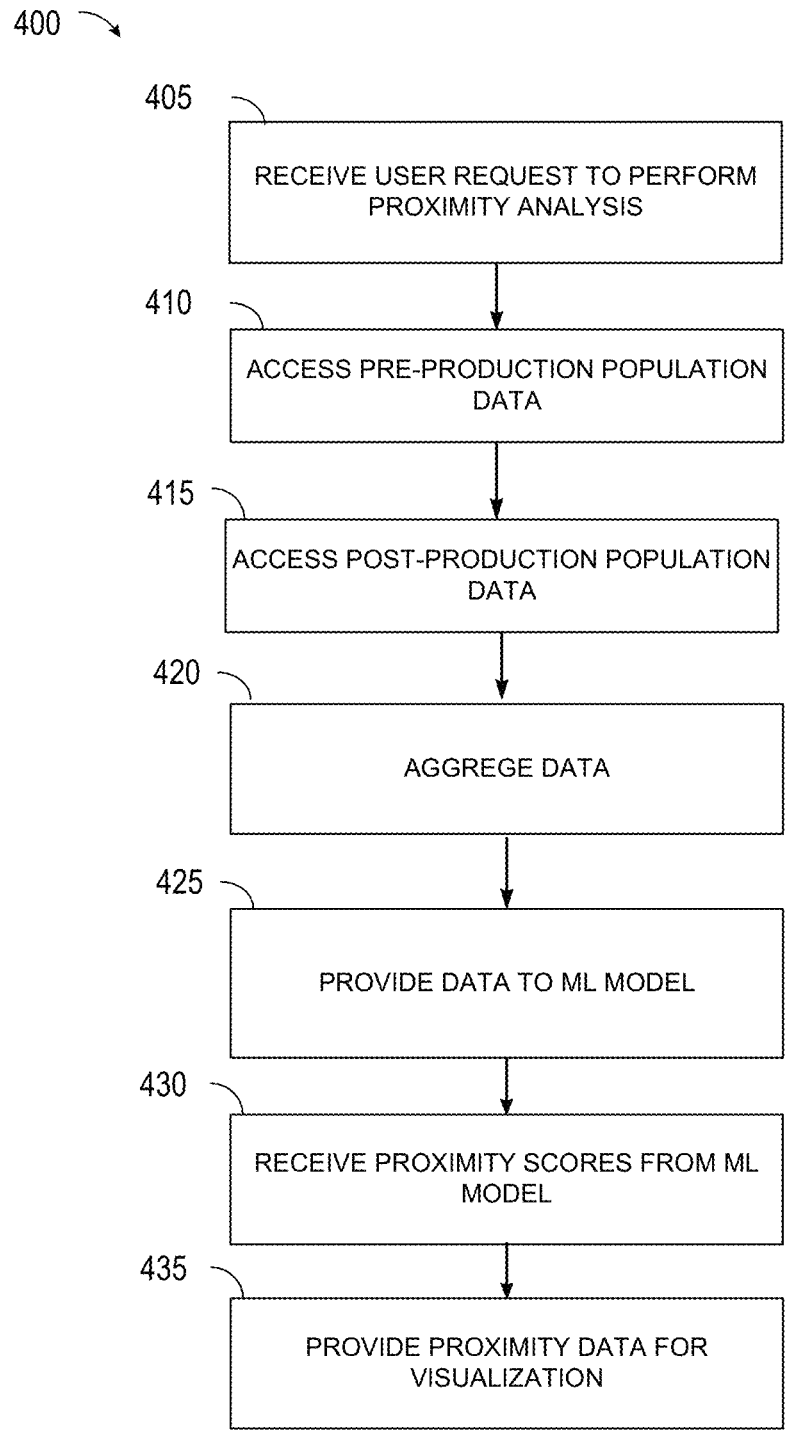
FIG. 4 is a flow diagram depicting an example method for determining proximity between different user populations.

FIG. 4 is a flow diagram depicting an exemplary method 400 for determining proximity between different user populations. In an example, one or more steps of method 400 may be performed by a proximity analysis application (e.g., proximity analysis application 152 of FIG. 1) and/or a proximity analysis service (e.g., proximity analysis service 112 of FIG. 1).

At 405, method 400 may begin by receiving a user request for perform a proximity analysis. The request may contain information about the populations for which proximity analysis is being requested. For example, it may include identifying information relating to pre-production and post-production populations used to test a software application. The request may also include information about type of software application and, the software build version for which testing is being performed. Furthermore, the request may include additional information such as a comparison metric, a type of characteristic for the populations, and the like. The request may be submitted via a UI element of a data proximity application and/or other visualization mechanism associated with the proximity analysis service and may include one or more parameters such as the selection of the software application, build version, comparison metric, characteristic and the like.

Once the request is received, method 400 may proceed to access data relating to the pre-production population, at 410. The data may be stored in a data store associated with the enterprise (e.g., software developer company) for which the proximity analysis is being done. The data store may be accessible to the proximity analysis service. Alternatively, the data may be transmitted to or retrieved by the proximity analysis service. The data may include telemetry data collected from the pre-production population and characteristics of the pre-production population. Method 400 may then proceed to access data relating to the post-production population, at 415. The post-production population data may include feedback information, data relating to characteristics of the post-production population and the like. Like the data of the pre-production population, data relating to the post-production population may be stored in a data store accessible to the proximity analysis service or may be transmitted to the proximity analysis service.

Once the required data is accessed, method 400 may proceed to aggregate the collected data, at 420. This may include combined data, when needed, or removing unnecessary data. When data aggregation has been completed, method 400 may proceed to provide the aggregated data as input to one or more ML models for processing, at 425. The ML models may include self-learning models that are able to learn how to process the aggregated data on their own. The ML models may process the data to calculate proximity scores for different characteristics of the populations based on a given comparison metric. Furthermore, the ML models may calculate an overall proximity score for the different populations. Additionally, the ML models may identify characteristics that are of importance to the analysis and/or rank the identified characteristics based on their relevance to the analysis.

Once the calculations are complete, method 400 may receive the proximity scores, identified characteristics, and/or the rankings from the ML models as outputs, at 430. Method 400 may then proceed to provide the received outputs to a visualization mechanism for displaying to the user, at 435. This may be achieved, for example, by transmitting display data containing the calculated data to the visualization mechanism. Additional information may be provided for display as requested by the viewer. The visualization mechanisms may include a UI interface associate with a proximity analysis application or visualization mechanism that may be selected by the user and/or enterprise submitting the request. The results may be visualized in accordance with the visualization mechanism selected to enable the user to view the findings.

Figure 5:
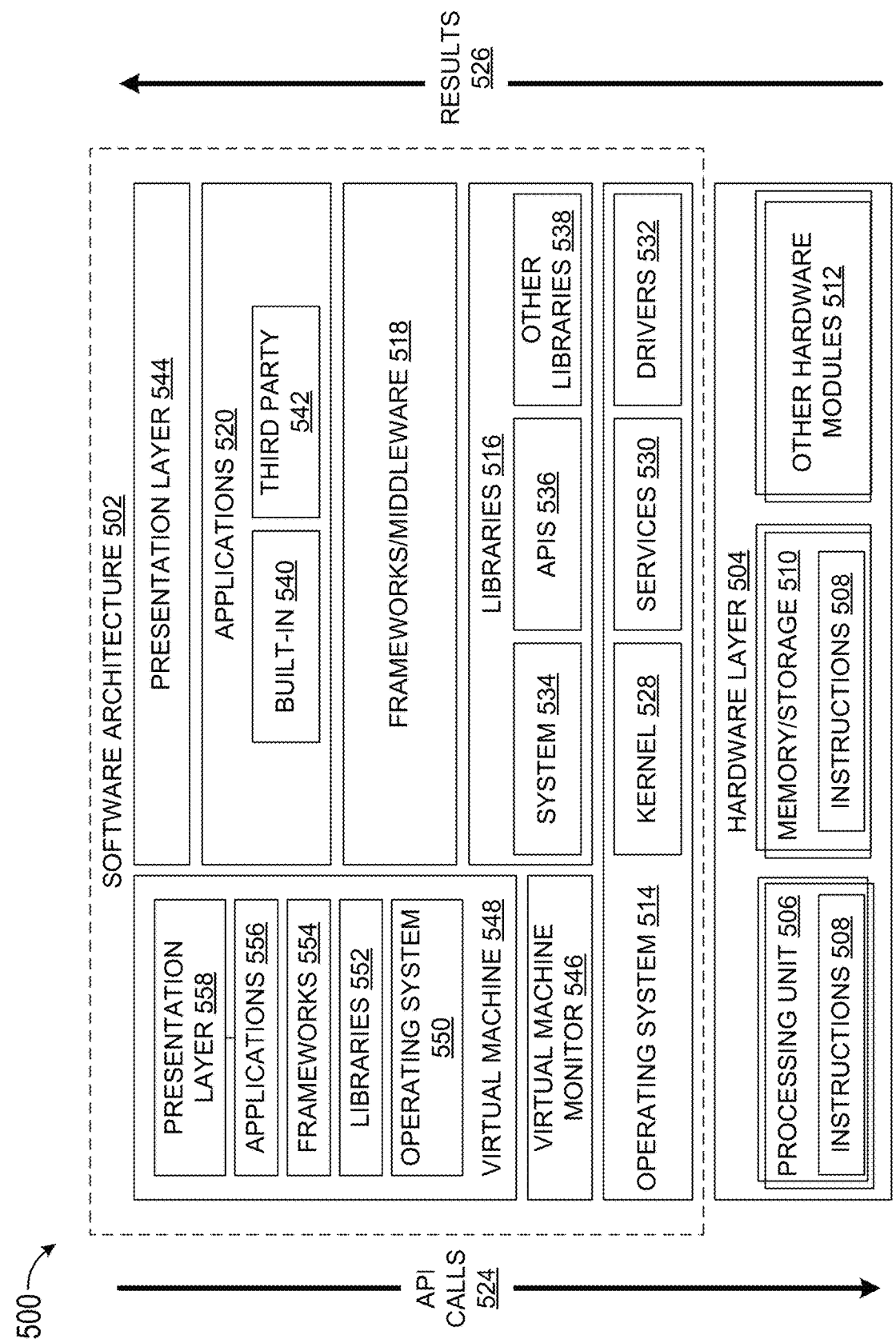
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
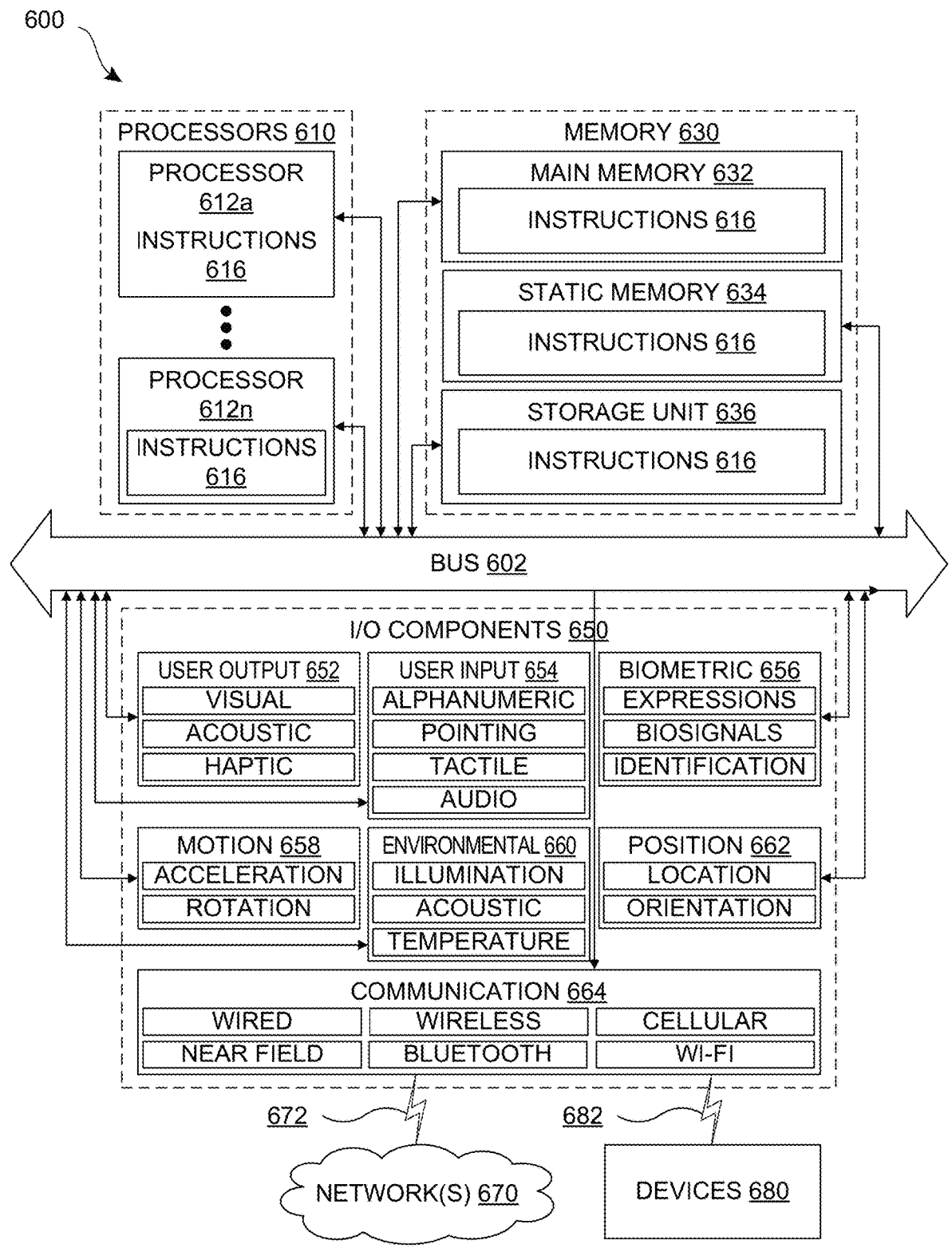
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving a request to perform a proximity analysis between a first user population and a second user population to determine proximity between the first user population and the second user population;
accessing data related to the first user population and the second user population, wherein the data related to the first user population includes at least one of telemetry data associated with testing of a software application and feedback data;
providing the data related to the first user population and the second user population as input to a machine-learning (ML) model for analyzing the data to determine the proximity between the first user population and the second user population;
receiving from the ML model as an output at least one proximity score between the first user population and the second user population; and
providing display data relating to the output to a visualization mechanism for display.

Item 2. The data processing system of item 1, wherein the instructions further cause the processor to cause the data processing system to perform functions of aggregating the data related to the first user population and the second user population before the data is provided to the ML model.

Item 3. The data processing system of items 1 or 2, wherein the first user population is a pre-production population and the second user population is a post-production population for testing a software application.

Item 4. The data processing system of item 3, wherein the pre-production population is smaller in size than the post-production population.

Item 5. The data processing system of any preceding item, wherein the data related to the second population includes at least one of telemetry data and feedback data.

Item 6. The data processing system of any preceding item, wherein the output includes at least one of a proximity metric relating to a characteristic of the first user population or the second user population, one or more characteristics identified as being relevant to a software application for which testing is being performed, and a ranking of the identified characteristics.

Item 7. The data processing system of any preceding item, wherein the visualization mechanism provides a quantitative comparison between the first user population and the second user population in an interactive manner.

Item 8. A method for analyzing a proximity between a first user population and a second user population, comprising:
receiving a request to perform a proximity analysis between the first user population and the second user population to determine proximity between the first user population and the second user population;
accessing data related to the first user population and the second user population, wherein the data related to the first user population includes at least one of telemetry data associated with testing of a software application and feedback data;
providing the data related to the first user population and the second user population as input to a machine-learning (ML) model for analyzing the data to determine proximity between the first user population and the second user population;
receiving from the ML model as an output at least one of a proximity score between the first user population and the second user population; and
providing display data relating to the output to a visualization mechanism for display.

Item 9. The method of item 8, further comprising aggregating the data related to the first user population and the second user population before the data is provided to the ML model.

Item 10. The method of items 8 or 9, wherein the first user population is a pre-production population and the second user population is a post-production population for testing a software application.

Item 11. The method of item 10, wherein the pre-production population is smaller in size than the post-production population.

Item 12. The method of any of items 8-11, wherein the data related to the second population includes at least one of telemetry data and feedback data.

Item 13. The method of any of items 8-12, wherein the output includes at least one of a proximity metric relating to a characteristic of the first user population or the second user population, one or more characteristics identified as being relevant to a software application for which testing is being performed, and a ranking of the identified characteristics.

Item 14. The method of any of items 8-13, wherein the visualization mechanism provides a quantitative comparison between the first user population and the second user population in an interactive manner.

Item 15. A non-transitory computer readable medium on which are stored instructions that, when executed, cause a programmable device to:
receive a request to perform a proximity analysis between a first user population and a second user population to determine proximity between the first user population and the second user population;
access data related to the first user population and the second user population, wherein the data related to the first user population includes at least one of telemetry data associated with testing of a software application and feedback data;
providing the data related to the first user population and the second user population as input to a machine-learning (ML) model for analyzing the data to determine the proximity between the first user population and the second user population;
receive from the ML model as an output at least one of a proximity score between the first user population and the second user population; and
provide display data relating to the output to a visualization mechanism for display.

Item 16. The non-transitory computer readable medium of item 15, wherein the instructions further cause the programmable device to aggregate the data related to the first user population and the second user population before the data is provided to the ML model.

Item 17. The non-transitory computer readable medium of items 15 or 16, wherein the first user population is a pre-production population and the second user population is a post-production population for testing a software application.

Item 18. The non-transitory computer readable medium of any of items 15-17, wherein the data related to the second population includes at least one of telemetry data and feedback data.

Item 19. The non-transitory computer readable medium of any of items 15-18, wherein the output includes at least one of a proximity metric relating to a characteristic of the first user population or the second user population, one or more characteristics identified as being relevant to a software application for which testing is being performed, and a ranking of the identified characteristics.

Item 20. The non-transitory computer readable medium of any of items 15-19, wherein the visualization mechanism provides a quantitative comparison between the first user population and the second user population in an interactive manner.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a memory in communication with the processor, the memory comprising executable instructions that, when executed by the processor, cause the data processing system to perform functions of:

receiving a request to perform a proximity analysis between a first user population and a second user population to determine proximity between the first user population and the second user population by determining a proximity between one or more characteristics of the first user population and one or more characteristics of the second user population, each of the one or more characteristics of the first and second user population referring to one attribute of the first and second user populations;

accessing data related to the one or more characteristics of the first user population and the one or more characteristics of the second user population, wherein the data related to the first user population includes at least one of telemetry data associated with testing of a software application and feedback data;

providing the data related the one or more characteristics of the first user population and the one or more characteristics of the second user population as input to a machine-learning (ML) model for analyzing the data to determine the proximity between the first user population and the second user population;

receiving from the ML model as an output at least one proximity score between the first user population and the second user population; and providing display data relating to the output to a visualization mechanism for display, wherein:

the ML model is trained, at least in part, by receiving the feedback data labeled via a data labeling element based on the one attribute of the first and second user populations and by utilizing the labeled feedback data to self-learn, and the trained ML model computes a similarity measure between at least one of the one or more characteristics of the first user population and one of the one or more characteristics of the second user population to determine the proximity between the first user population and the second user population.

2. The data processing system of claim 1, wherein the instructions further cause the processor to cause the data processing system to perform functions of aggregating the data related to the first user population and the second user population before the data is provided to the ML model.

3. The data processing system of claim 1, wherein the first user population is a pre-production population and the second user population is a post-production population for testing a software application.

4. The data processing system of claim 3, wherein the pre-production population is smaller in size than the post-production population.

5. The data processing system of claim 1, wherein the data related to the second population includes at least one of telemetry data and feedback data.

6. The data processing system of claim 1, wherein the output includes at least one of one or more characteristics identified as being relevant to a software application for which testing is being performed, and a ranking of the identified characteristics.

7. The data processing system of claim 1, wherein the visualization mechanism provides a quantitative comparison between the first user population and the second user population in an interactive manner.

8. The data processing system of claim 1, wherein the instructions further cause the processor to cause the data processing system to perform functions of:
identifying which characteristics of the one or more characteristics of the first user population and the one or more characteristics of the second user population are relevant to testing of the software application;
calculating proximity scores for characteristics identified as being relevant to testing of the software application; and
calculating the proximity score between the first user population and the second user population based on the calculated proximity scores.

9. A method for analyzing a proximity between a first user population and a second user population, comprising:
receiving a request to perform a proximity analysis between a first user population and a second user population to determine proximity between the first user population and the second user population by determining a proximity between one or more characteristics of the first user population and one or more characteristics of the second user population, each of the one or more characteristics of the first and second user population referring to one attribute of the first and second user populations;
accessing data related to the one or more characteristics of the first user population and the one or more characteristics of the second user population, wherein the data related to the first user population includes at least one of telemetry data associated with testing of a software application and feedback data;
providing the data related the one or more characteristics of the first user population and the one or more characteristics of the second user population as input to a machine-learning (ML) model for analyzing the data to determine the proximity between the first user population and the second user population;
receiving from the ML model as an output at least one proximity score between the first user population and the second user population; and
providing display data relating to the output to a visualization mechanism for display,
wherein:
the ML model is trained, at least in part, by receiving the feedback data labeled via a data labeling element based on the one attribute of the first and second user populations and by utilizing the labeled feedback data to self-learn, and
the trained ML model computes a similarity measure between at least one of the one or more characteristics of the first user population and one of the one or more characteristics of the second user population to determine the proximity between the first user population and the second user population.

10. The method of claim 9, further comprising aggregating the data related to the first user population and the second user population before the data is provided to the ML model.

11. The method of claim 9, wherein the first user population is a pre-production population and the second user population is a post-production population for testing a software application.

12. The method of claim 11, wherein the pre-production population is smaller in size than the post-production population.

13. The method of claim 9, wherein the data related to the second population includes at least one of telemetry data and feedback data.

14. The method of claim 9, wherein the output includes at least one of one or more characteristics identified as being relevant to a software application for which testing is being performed, and a ranking of the identified characteristics.

15. The method of claim 9, wherein the visualization mechanism provides a quantitative comparison between the first user population and the second user population in an interactive manner.

16. A non-transitory computer readable medium on which are stored instructions that, when executed, cause a programmable device to:
receive a request to perform a proximity analysis between a first user population and a second user population to determine proximity between the first user population and the second user population by determining a proximity between one or more characteristics of the first and second user population referring to one attribute of the first and second user populations;
access data related to the one or more characteristics of the first user population and the one or more characteristics of the second user population, wherein the data related to the first user population includes at least one of telemetry data associated with testing of a software application and feedback data;
provide the data related the one or more characteristics of the first user population and the one or more characteristics of the second user population as input to a machine-learning (ML) model for analyzing the data to determine the proximity between the first user population and the second user population;
receive from the ML model as an output at least one of a proximity score between the first user population and the second user population; and
provide display data relating to the output to a visualization mechanism for display, wherein:
the ML model is trained, at least in part, by receiving feedback data labeled via a data labeling element based on the one attribute of the first and second user populations and by utilizing the labeled feedback data to self-learn, and
the trained ML model computes a similarity measure between at least one of the one or more characteristics of the first user population and one of the one or more characteristics of the second user population to determine the proximity between the first user population and the second user population.

17. The non-transitory computer readable medium of claim 16, wherein the instructions further cause the programmable device to aggregate the data related to the first user population and the second user population before the data is provided to the ML model.

18. The non-transitory computer readable medium of claim 16, wherein the first user population is a pre-production population and the second user population is a post-production population for testing a software application.

19. The non-transitory computer readable medium of claim 16, wherein the data related to the second population includes at least one of telemetry data and feedback data.

20. The non-transitory computer readable medium of claim 16, wherein the output includes at least one of one or more characteristics identified as being relevant to a software application for which testing is being performed, and a ranking of the identified characteristics.

21. The non-transitory computer readable medium of claim 16, wherein the visualization mechanism provides a quantitative comparison between the first user population and the second user population in an interactive manner.

* * * * *